United States Patent
Brown

[11] Patent Number: 6,136,250
[45] Date of Patent: Oct. 24, 2000

[54] APPARATUS AND METHOD OF ENCAPSULATING MOTORS

[75] Inventor: Fred A. Brown, Coronado, Calif.

[73] Assignee: Comair Rotron, Inc., San Diego, Calif.

[21] Appl. No.: 09/016,386

[22] Filed: Jan. 30, 1998

[51] Int. Cl.[7] .......................... B29C 45/14; B29C 70/70
[52] U.S. Cl. ...................... 264/272.2; 264/276
[58] Field of Search ................ 264/272.19, 272.2, 264/276; 310/88, 89, 90; 29/596, 598

[56] References Cited

U.S. PATENT DOCUMENTS

| | | | |
|---|---|---|---|
| 3,344,513 | 10/1967 | Bemmann et al. .................. | 264/272.2 |
| 3,979,822 | 9/1976 | Halm ........................................ | 29/596 |
| 4,922,604 | 5/1990 | Marshall et al. .......................... | 310/90 |
| 4,950,438 | 8/1990 | Nakamura et al. .................. | 264/272.2 |
| 5,038,460 | 8/1991 | Ide et al. ..................................... | 29/596 |
| 5,095,612 | 3/1992 | McAvena ............................... | 264/272.2 |
| 5,149,483 | 9/1992 | Okey et al. ........................... | 264/272.2 |
| 5,239,742 | 8/1993 | Kobayashi et al. ....................... | 29/596 |
| 5,806,169 | 9/1998 | Trago et al. .............................. | 310/42 |
| 5,853,643 | 12/1998 | Bauer ................................... | 264/272.2 |

*Primary Examiner*—Angela Ortiz
*Attorney, Agent, or Firm*—Bromberg & Sunstein LLP

[57] ABSTRACT

An apparatus and method of fabricating an electric motor encapsulates the major assemblies of the motor in protective encapsulating material. The method begins by assembling a blade and housing, a motor stator, a motor rotor and associated control circuitry into a complete electric fan. The operational characteristics of the complete fan are then tested to verify proper operation. The blade and rotor assemblies are then removed from the complete fan so that a mold may be positioned onto the fan. Encapsulating material is injected into the mold so as to encase the fan in the encapsulating material. The mold is removed and the blade and rotor assemblies are reinserted. Embodiments may use various encapsulating materials such as urethanes, silicones, or epoxies.

18 Claims, 5 Drawing Sheets

APPARATUS AND METHOD OF ENCAPSULATING MOTORS

FIELD OF THE INVENTION

This invention relates to electric motors, and more particularly, to encapsulating electric motors and their associated electronics.

BACKGROUND OF THE INVENTION

Electrical and mechanical equipment used in telecommunications and transportation applications typically require cooling fans to cool their associated electrical components. Such fans commonly are exposed to challenging physical environments, including salt spray, water, dust, impulse shock loadings, and vibration. Exposure to such challenging physical environments increases the failure rate and reduces the service lifetime of such cooling fan motors.

Some applications protect the electronics by means of a conformal coating—a thin layer of protective material which is applied by aerosol spray or by dipping the components in liquid conformal material. When the material hardens, a relatively thin vapor-proof barrier protects the components. However, conventional conformal coatings are a poor choice for use in electric motors because of the broad thermal cycling range of their component parts. As the motor runs, the components generate significant heat due to the flow of electric current and friction effects. The relatively thin layer of conformal coating is typically unable to expand and contract with the heating and cooling (after operation stops) of the underlying components, thus compromising the structural integrity of the conformal shell.

Moreover, conformal coatings provide little, if any, protection from the adverse effects of mechanical shock and vibration. One example of such effects is a wire clothes hanger which is broken by repeated flexing of the same spot. The hanger breaks easily because the metal structure has been substantially damaged and weakened at the spot of repeated flexing, a process known as work hardening. Similarly, exposure to mechanical shock and vibration causes work hardening of the various component parts of motors. After sufficient length of time, catastrophic failure of the physical structure of such component parts occurs.

Some methods, e.g., Marshall et al., U.S. Pat. No. 4,922,604, have attempted to provide environmental protection by embedding components of a motor, during the motor assembly process, in protective encapsulating material that is much thicker than known conformal coatings. These approaches have the advantage of providing the desired environmental protection across a broad thermal operating range. However, such methods encapsulate components as part of the motor assembly process, increasing the cost and complexity of assembly. For example, the encapsulating process described in Marshall et al. requires that an encapsulated stator assembly subsequently be machine bored, for instance by diamond lapping, to allow for the later insertion of a motor rotor. Another drawback of encapsulating motor components as part of the motor assembly process is the uneconomic encapsulation of assemblies and subassemblies which may later fail to pass one or more post-assembly quality control tests and be rejected.

SUMMARY

A preferred embodiment of the present invention includes an improved apparatus and method of manufacturing an electric motor to envelop selected components in protective encapsulating material after the motor has been assembled and tested. To that end, a rotor is removed from a complete motor so that a mold may be positioned on the remaining portion of the motor. The motor may have a housing which may further be in registry with the mold to ensure proper alignment of the mold with respect to the housing. Encapsulating material in a liquid-form then is injected into the mold to encapsulate a portion of the motor in the encapsulating material. The portion encapsulated may include motor control circuitry, stator poles, stator windings, or the entire stator. After the encapsulating material solidifies, the mold is removed and the rotor is reinserted onto the remaining portion of the motor. An embodiment may connect the rotor, which may have fan blades, to the motor after the mold is removed. Embodiments may use various encapsulating materials, for example, fluids such as urethanes, silicones, or epoxies. A related embodiment may be a motor manufactured according to a preferred embodiment of the method.

Another embodiment includes an apparatus and method of encapsulating an electric motor, the motor comprising a rotor, stator and associated motor control circuitry. This embodiment requires positioning a mold on a portion of the motor, with the mold in registry with the portion of the motor. Then, a material is injected into the mold to encapsulate at least a portion of the motor, after which, the mold is removed. The portion encapsulated may include motor control circuitry, stator poles, stator windings, or the entire stator. After the encapsulating material solidifies, the mold is removed and the rotor is reinserted onto the remaining portion of the motor. An embodiment may connect the rotor, which may have fan blades, to the motor after the mold is removed. Embodiments may use various encapsulating materials, for example, fluids such as urethanes, silicones, or epoxies. A related embodiment may be a motor manufactured according to a preferred embodiment of the method.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF SPECIFIC EMBODIMENTS

In preferred embodiments of the invention, an improved method and apparatus envelops an electric motor and its associated electronics in encapsulating material. A preferred embodiment of the invention avoids drawbacks of conventional conformal coatings since the encapsulating material may be selected to dissipate heat adequately for the broad thermal cycling range of electric motors. In addition, the encapsulating material, is substantially thicker than conformal coatings and completely envelops the various component parts of the motor, offering significant protection against the effects of vibration and mechanical shock. For example, component fatigue failures due to vibration-caused work hardening may be significantly reduced. A preferred embodiment also offers significant savings because the motor can be completely assembled and pretested in its housing prior to encapsulation, thus ensuring the electrical and mechanical integrity of the motor prior to encapsulation. If the motor is determined to be defective, then it is not encapsulated, consequently saving time and manufacturing costs.

Figure 1:
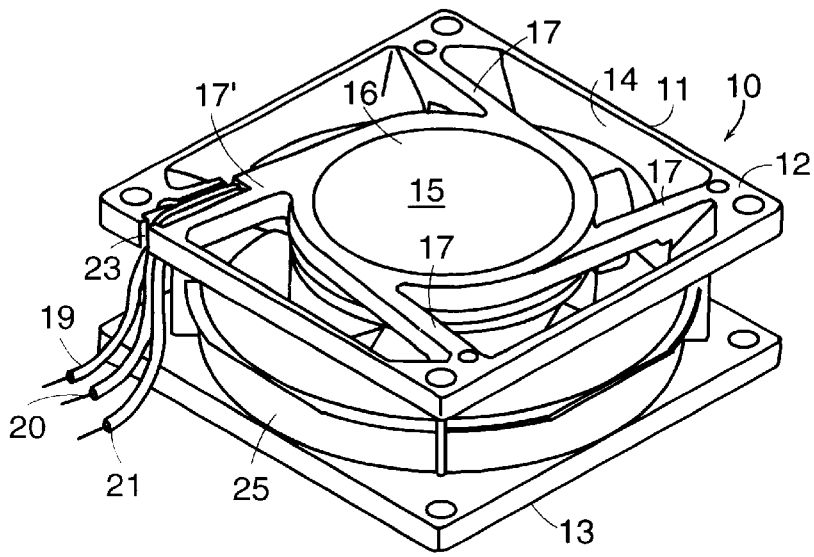
FIG. 1 is a perspective view of a typical electric motor as embodied in a fan.

FIG. 1 is a perspective view of the component parts of a typical electric motor that may be utilized with preferred embodiments of the invention. The motor, in this case, is implemented as a brushless direct current fan 10, as described in Brown, U.S. Pat. No. 4,656,553. The fan's motor, generally designated 15, is centrally located within a housing 11 having a front surface 12, a rear surface 13, and a venturi 14 extending between the front and rear surfaces. A stator and control circuit are supported in fixed relation to the housing 12 in a central housing section 16 connected to the venturi by struts 17 of a spider structure. Leads 19, 20, and 21 are brought out from the motor electronics along one strut 17' specially formed for this purpose with a longitudinal channel leading to a narrow groove 23 at the outer periphery of the motor housing 12. The groove contains the leads in the channel while directing them toward the generally cylindrical exterior 25 of the housing 11 as shown.

Figure 2A:
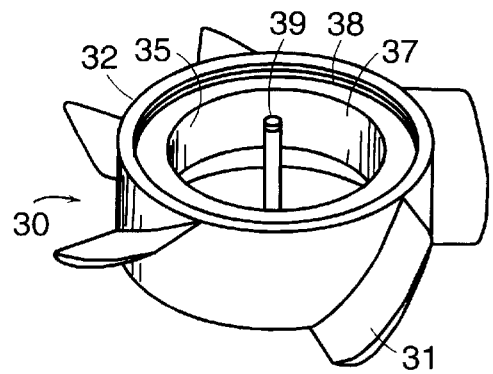
FIG. 2a is a perspective view of a rotor and fan blade assembly associated with the motor in FIG. 1.
Figure 2B:
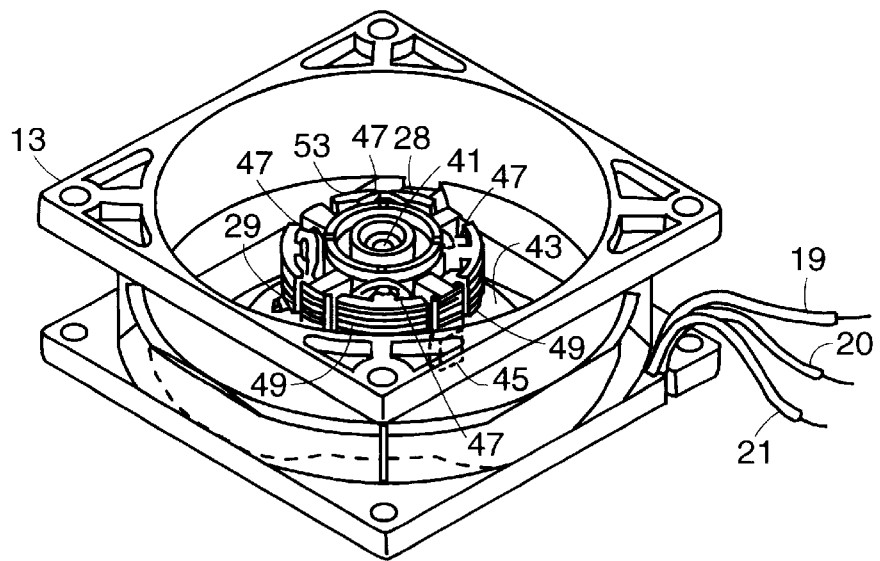
FIG. 2b is a perspective view of a stator, circuit board, venturi, and housing of the fan of FIG. 1.

FIGS. 2a and 2b show the rotational and stationary parts of the fan of FIG. 1 separated. FIG. 2b shows the housing 11, a stator 28, and control circuit 29 of the fan 10 of FIG. 1, inverted from their FIG. 1 position. FIG. 2a illustrates an impeller 30 of the fan 10 of FIG. 1. The impeller 30 includes fan blades 31 supported on a hub 32, for example of plastic, in turn secured to the rotor 35 of the fan's motor 15. The rotor 35 has an annular permanent magnet 37 in a steel cup 38. A central shaft 39 secured to the end face of the cup 38 is received in bearings 41 in the stator assembly of FIG. 2b when the fan 10 is assembled.

In FIG. 2b, the control circuit 29 is mounted on a circular printed circuit board (PCB) 43. For commutation, a Hall sensor 45 is supported on the PCB 43 where it is located inside the magnet 37, just opposite a commutation portion of that magnet used to control switching of current to windings 47 on the stator. This, in FIG. 2a, is the portion of the magnet 37 nearest the open end of the cup. A field magnet portion of the magnet 37 interacts with poles 49 of the stator to effect rotation of the impeller upon proper commutation of the energizing current to the windings 47 of the stator. Leads 19 and 20 supply the electrical power that activates the control circuit 29 and energizes the windings 47. The lead 21 is used to tailor the operation of the fan to the end user's particular needs in the manner described in the applicant's earlier U.S. Pat. No. 4,656,553.

Figure 3:
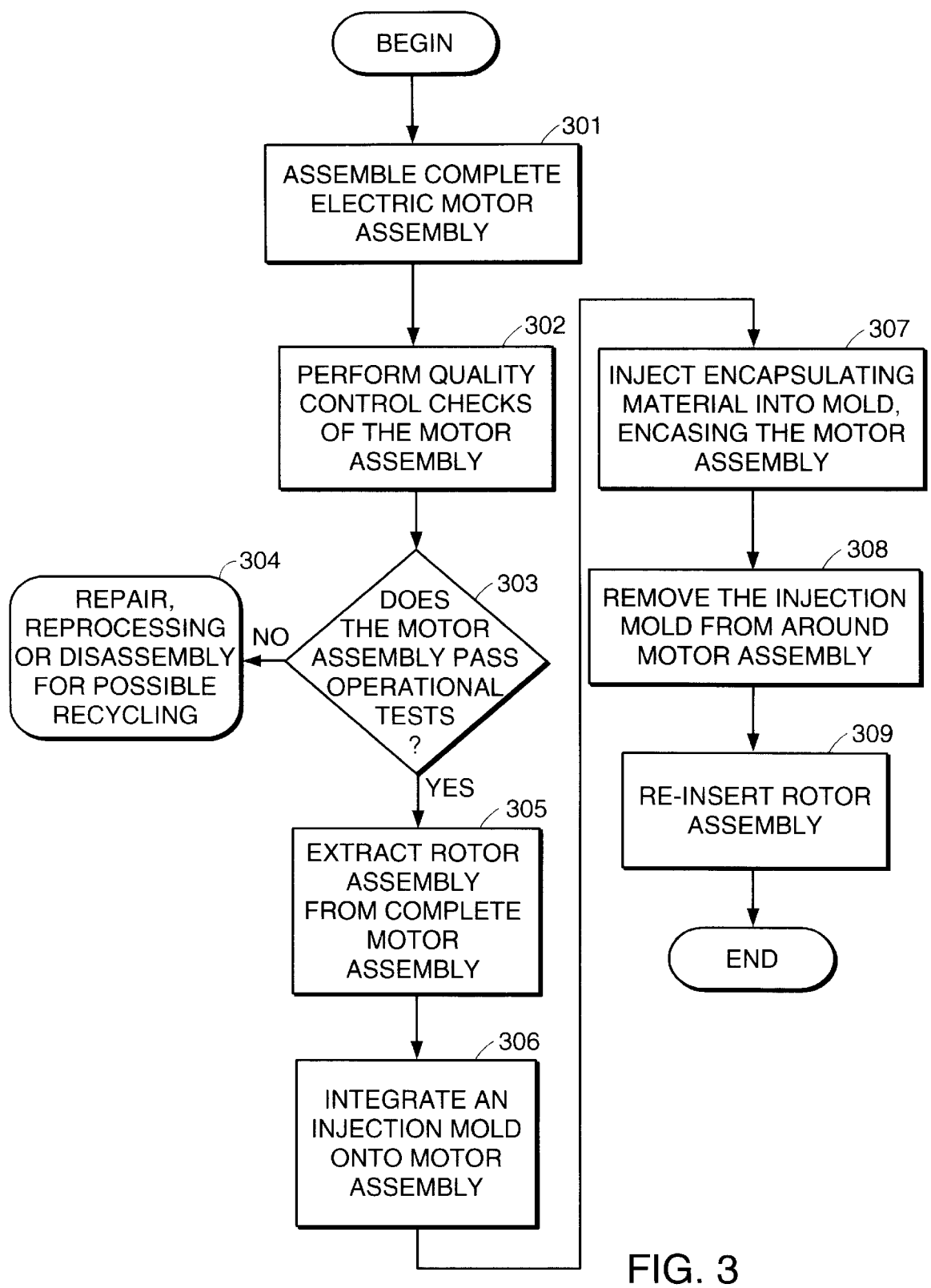
FIG. 3 illustrates a process for encapsulating an electric motor in accordance with a referred embodiment of the invention.
Figure 4:
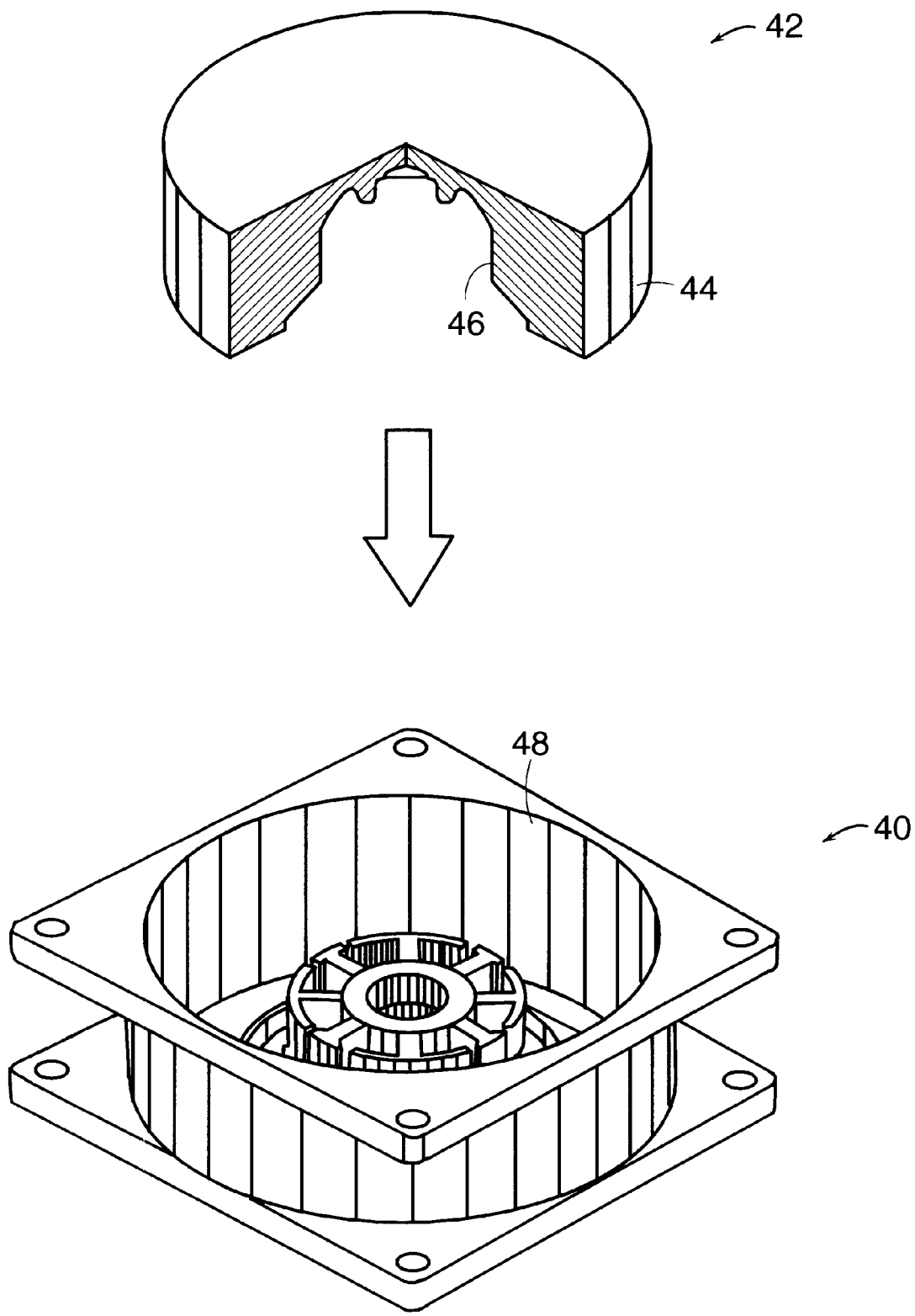
FIG. 4 illustrates the positioning of a mold around a motor subassembly according to a referred embodiment.
Figure 5:
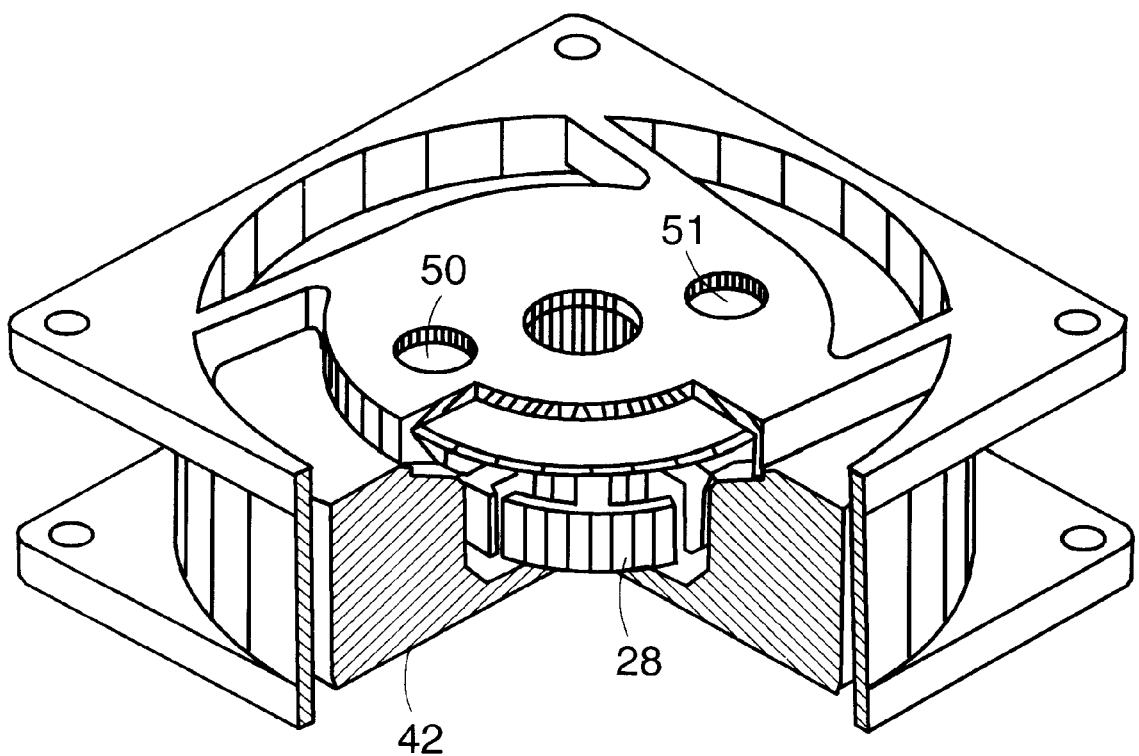
FIG. 5 illustrates the underside of a motor subassembly manufactured according to a preferred embodiment.

A preferred embodiment of the invention is illustrated in FIGS. 3–6 as applied to an electric motor shown in FIGS. 1–2b. More particularly, FIG. 3 shows a process of a preferred embodiment for encapsulating a motor. The process begins at step 301, with the assembly of a complete electric motor, such as the fan 10 illustrated in FIG. 1. In an alternate embodiment, the encapsulating process may start with an existing motor rather than a newly manufactured motor.

Subsequent steps of a preferred embodiment do not compromise electrical or mechanical integrity of the motor, and therefore, the complete motor may be quality control tested to verify proper operation of the entire assembly (step 302). Such tests may include structural checks, rotation checks, noise and vibration tests, insulation tests, resistance tests, and verification of proper starting and running current. Any assembled motors which fail the quality control tests may be diverted out of the subsequent steps of the method of the present invention for possible repair, reprocessing, or disassembly for recycling (steps 303 and 304). Significant savings may be realized and manufacturing time may be reduced since only motors passing the quality control tests are processed according to subsequent steps of a preferred embodiment.

Once the motor passes the quality control tests (steps 302 and 303), the impeller 30 containing the rotor 35 is removed from the motor 15 (step 305) to form a motor subassembly 40, which includes the stator 28, control circuit 29, and housing 11. An external mold 42, shown in FIG. 4, may then be positioned onto the motor subassembly 40 (step 306 in FIG. 3). The inner surface of the mold 46 is manufactured to precise tolerances to control the thickness of the subsequent encapsulating material. The outer surface of the mold 44 and the inner surface of the housing 48 are keyed with matching grooves and ridges to ensure that the mold 42 is properly aligned with respect to the motor subassembly 40. Thus, the outer surface of the mold 44 and the inner surface of the housing 48, enable the mold 42 and the motor subassembly 40 to be in registry. In alternate embodiments, the mold 42 is configured to have an inner diameter that may be in registry with an outer dimension of the motor subassembly 40.

Following integration of the mold 44 around the motor subassembly 40, encapsulating material in liquid form may be injected into the mold through a potting hole 50 (in FIG. 5), to envelop all the exposed structures of the motor subassembly, until liquid is forced out a potting vent 51 (step 307). In a preferred embodiment, the encapsulating material may be silicone. In alternative embodiments, the encapsulating material may be urethane, epoxy, a butadiene polymer, or other suitable material.

Figure 6:
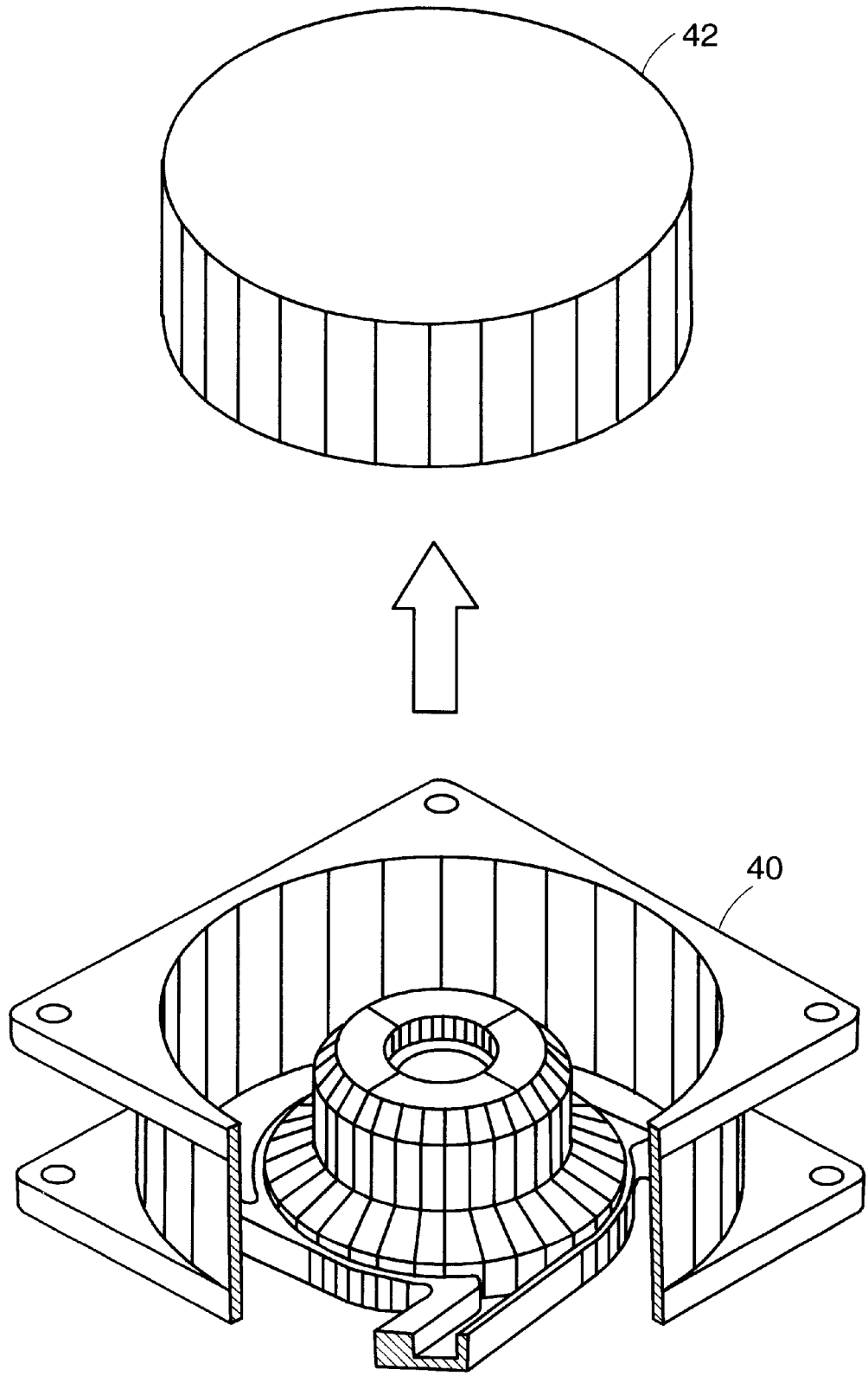
FIG. 6 illustrates the removal of the mold from around an encapsulated motor subassembly according to a preferred embodiment.

After a curing period during which the liquid encapsulating material solidifies, the mold 42 may be removed from the motor subassembly 40 (shown in FIG. 6, and step 308 of FIG. 3). As a result of the precise tolerances on the inner surface of the mold 46 (in FIG. 4), the encapsulating material near the outer surface of the stator 28 is relatively thin to avoid encroachment into an air gap between the stator 28 and the rotor 35, and thus does not interfere with normal rotor rotation. In other regions of the motor subassembly 40, the encapsulating material may be relatively thicker so as to form a strong encapsulating barrier and offer substantial protection from challenging environmental factors such as salt spray, dust, vibration, shock, water submersion, etc.

With the re-insertion of the rotor (step 309), the encapsulating process is complete. Throughout the service life of the motor 15, the stator 28, windings 47, and PCB 43 containing all the associated sensors, power components, and control circuits 29 should be covered and protected from the environment by the encapsulating material.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. A method of encapsulating an inside out electric motor, the motor comprising a housing, a cylindrical permanent magnet rotor, and a cylindrical stator including associated motor control circuitry, the stator being concentrically within the rotor so as to define an annular air gap between the stator and the rotor, the method comprising:

a. removing the permanent magnet rotor from the motor to produce a motor subassembly that includes all the electrically conductive components of the motor;

b. positioning a mold onto the motor subassembly including registering the mold with the housing so that the mold concentrically surrounds the motor subassembly with the inner surface of the mold adjacent the outer surface of the stator;

c. injecting a material into the mold to encapsulate all the electrically conductive components of the motor in the material, the inner surface of the mold preventing the injected material from encroaching beyond the outer surface of the stator and compromising the annular air gap; and d. removing the mold from the motor subassembly.

2. A method according to claim 1, further comprising the step of:

e. connecting the rotor to the motor subassembly.

3. A method according to claim 1, wherein the step of removing the mold occurs after the material has substantially solidified.

4. A method according to claim 1, wherein the material is urethane.

5. A method according to claim 1, wherein the material is silicone.

6. A method according to claim 1, wherein the material is epoxy.

7. A method according to claim 1, wherein the motor includes a housing and wherein the mold is in registry with the housing.

8. A method according to claim 1, wherein the housing has an inner dimension and the mold has an outer dimension, the mold outer dimension being in registry with the housing inner dimension.

9. A method according to claim 1, wherein the housing has an outer dimension and the mold has an inner dimension, the mold inner dimension being in registry with the housing outer dimension.

10. A method according to claim 1, wherein the rotor includes fan blades.

11. A method according to claim 1, further including the step of:

f. testing the motor prior to removing the rotor to verify proper operational characteristics.

12. A method of encapsulating an inside out electric motor, the motor comprising a housing, a cylindrical permanent magnet rotor, and a cylindrical stator including associated motor control circuitry, the stator being concentrically within the rotor so as to define an annular air gap between the stator and the rotor, the method comprising:

a. positioning a mold on a portion of the motor including the stator and all the electrically conductive components of the motor, in registry with the portion of the motor so that the mold concentrically surrounds the portion of the motor with the inner surface of the mold adjacent the outer surface of the stator;

b. injecting a material into the mold to encapsulate all the electrically conductive components of the motor in the material, the inner surface of the mold preventing the injected material from encroaching beyond the outer surface of the stator and compromising the annular air gap; and c. removing the mold from the portion of the motor.

13. A method according to claim 12, wherein the material is urethane.

14. A method according to claim 12, wherein the material is silicone.

15. A method according to claim 12, wherein the material is epoxy.

16. A method according to claim 12, wherein the housing has an inner dimension and the mold has an outer dimension, the mold outer dimension being in registry with the housing inner dimension.

17. A method according to claim 12, wherein the housing has an outer dimension and the mold has an inner dimension, the mold inner dimension being in registry with the housing outer dimension.

18. A method according to claim 12, further including testing the motor prior to positioning the mold to verify proper operational characteristics.

* * * * *